United States Patent [19]

Fukuda et al.

[11] Patent Number: 4,935,473
[45] Date of Patent: Jun. 19, 1990

[54] POLYPHENYLENE SULFIDE COMPOSITION AND METHOD OF PRODUCING THE SAME

[75] Inventors: Makoto Fukuda, Kasukabe; Yukio Ichikawa; Takayuki Katto, both of Iwaki; Toshikatsu Nitoh, Fuji, all of Japan

[73] Assignees: Kureha Kagaku Kogyo Kabushiki Kaisha, Tokyo; Polyplastics Co., Ltd., Osaka, both of Japan

[21] Appl. No.: 279,098

[22] Filed: Dec. 2, 1988

[30] Foreign Application Priority Data

Dec. 3, 1987 [JP] Japan .................. 62-306172

[51] Int. Cl.$^5$ .............................. C08G 75/14
[52] U.S. Cl. ................... 525/537; 524/188; 524/609; 528/388
[58] Field of Search ............ 525/537; 524/188, 609; 528/388, 487, 490, 492

[56] References Cited

U.S. PATENT DOCUMENTS 4,451,601  5/1984  Blackwell ............... 524/263
4,645,826  2/1987  Iizuka et al. ............ 528/388

Primary Examiner—Harold D. Anderson
Assistant Examiner—T. Mosley
Attorney, Agent, or Firm—Oblon, Spivak, McClelland, Maier & Neustadt

[57] ABSTRACT

The present invention discloses a composition comprising a mixture containing 100 parts by weight of substantially linear polyphenylene sulfide which is treated with an aqueous solution of an acid or a salt of a strong acid and a weak base and which has not less than 70 mol % of a repeating unit of

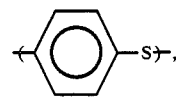

0.05 to 5 parts by weight of at least one aminoalkoxysilane compound and, if necessary, 0.01 to 3 parts by weight of a releasing agent, the mixture being kneaded under heating at a temperature higher than the melting point of the polyphenylene sulfide, said composition exhibiting excellent impact strength and weld strength and providing molded product with small amount of flash generated during molding. The invention also discloses a composition which further comprises a fibrous reinforcing material and/or an inorganic powdered or granular filler, according to necessity, as well as disclosing a method of producing said composition.

20 Claims, No Drawings

POLYPHENYLENE SULFIDE COMPOSITION AND METHOD OF PRODUCING THE SAME

BACKGROUND OF THE INVENTION

The present invention relates to a polyphenylene sulfide composition having improved melt flow properties and particularly low generation of flashes when injection molded, as well as excellent strength at welded part (hereinafter referred to as "weld strength") and impact strength and also relates to a method producing the same.

Injection molded products made of a composition of polyphenylene sulfide (hereinafter referred to as "PPS") containing a reinforcing fiber or filler are excellent in heat resistance and chemical resistance and moreover, they have an advantage, which molded product made of other engineering plastics do not have, such as excellent electric insulation and dimentional stability. Accordingly, PPS is used in many industrial fields.

However, since molecular weight of conventional PPS having not treated after its polymerization reaction is low, namely, its melt viscosity is too low to be fabricated as it is, to apply such PPS for a practical use, so far it can not avoid to be cured with a treatment such as thermal treatment under existence of oxygen gas.

Usually, as such curing is performed with cross-linking, the molded products of such polymer is relatively poor in its toughness and even when some reinforcing material or filler is added to the polymer, its molded products are poor in their impact strength and in their weld strength. Accordingly, prompt actions to improve those defects are keenly requested.

As an example of such improvement, PPS, which is manufactured by the process described in U.S. Pat. No. 4,645,826, having a repeating unit of

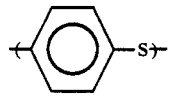

not less than 70 mol% of the total repeating units and a substantially linear structure (hereinafter referred to as "the linear PPS") is excellent in its toughness. Further, molded products of a composition made of the linear PPS have a much better impact strength and weld strength than molded products of a conventional PPS composition. This is the reason why the linear PPS draw the attention of many people to be suitable for the molded products which have many thin parts or the products which have a piece of metal in them. However, even when this linear PPS having an excellent toughness is fabricated, for example, injection-molded into precision molds, it is prone to generate much amount of flash on the molds.

The present inventors have already proposed in Japanese Patent Application No. 62-84,110/1987 a method to obtain a composition which has good anti-flash property by blending specific silane compound to the linear PPS, increasing the melt viscosity and further, raising the dependency of the viscosity upon its shear rate.

Further, as the arts to obtain a composition by blending conventional PPS with a silane compound, there are several disclosures, for examples, (1) Japanese Patent Application Laid-Open (KOKAI) No. 59-31,503 (1984) discloses an electronic part encapsulated with a composition comprising PPS and mercaptosilane, being excellent in water resistance and in electric properties under high temperature and high humidity, (2) U.S. Pat. No. 4,451,601 discloses a composition containing polyarylene sulfide and at least one organosilane, having improved anti-hydrolytic property and (3) Japanese Patent Application Laid-Open(KOKAI) No. 55-29,526 (1980) discloses a composition comprising 100 parts by weight of PPS, 0 to 30 parts by weight of fillers and 0.01 to 10 parts by weight of aminoalkoxysilane or its hydrolytic condensate and being excellent in water resistance, humidity resistance and in electric properties.

Furthermore, Japanese Patent Application Laid-Open (KOKAI) No. 61-285,255 discloses a composition of PPS containing a fibrous filler and/or another silicate filler and a silane compound having at least two unsaturated double bonds in its molecular and/or a non-hydrochloride silane compound having at least one unsaturated double bond and at least one amino group in its molecular, being excellent in its strength and electrical properties.

In these already known arts, the silane compound has been used to improve various properties of the composition, namely, (1) adhesion between PPS and an inorganic filler and (2) strength, humidity resistance and electric properties. Among these improvements, Japanese Patent Application Laid-Open (KOKAI) No. 55-29,526 (1980) discloses the increase of its melt flow, namely, the reduction of its melt viscosity, by adding aminoalkoxysilane to PPS and U.S. Pat. No. 4,451,601 also discloses a similar effect to reduce its melt viscosity by adding γ-ureidopropyl-triethoxysilane to PPS. Such effect of silane compounds to reduce melt viscosity is just contrary to the object of the present invention.

As a result of the present inventors' extensive studies to manufacture a composition of the linear PPS being excellent in impact and weld strength and having improved anti-flash properties accompanied with high melt viscosity with an inexpensive way, they have found the following facts and based on these findings, completed the present invention:

(1) A composition obtained by treating the linear PPS with an aqueous solution of an acid or a salt of a strong acid and a weak base, blending an aminoalkoxysilane compound to the treated PPS and melt-kneading the blend at the temperature higher than melting point of the linear PPS, can improve its melt properties, such as, an increase of its melt viscosity and an increase of the dependency of the melt viscosity on its shear rate, no matter what polymerization degree, that is, what melt viscosity the PPS has. Further, the linear PPS without the treatments with said aqueous solution can not have such remarkable improvement of its melt property after blending an aminoalkoxysilane compound and melt kneading the blend.

(2) The composition, obtained by treating the linear PPS with the above aqueous solution, blending with an aminoalkoxysilane compound and melt-kneading, can have an remarkably improved impact strength compared with the linear PPS without above treatments or the linear PPS only treated with the aqueous solution. Further, this composition can also have a largely improved anti-flash property during its molding. However, there is a sign that a trace of ejector pin remains on its molded product and also a release of the product from the mold does not go smoothly.

(3) The composition obtained by treating the linear PPS with said aqueous solution, blending with an aminoalkoxysilane compound and a releasing agent and melt-kneading has somewhat less effect on an improvement of its melt property but still has an excellent anti-flash property. Further, release of its molded products from the mold proceed smoothly. On the other hand, a composition, for comparison, obtained by treating the linear PPS with said aqueous solution, blending a releasing agent (without an aminoalkoxysilane compound) and melt-kneading has an improved property of being released from the mold but has an adverse effect to generate much amount of flash making its melt viscosity lower.

SUMMARY OF THE INVENTION

An object of the present invention is to provide a PPS composition which has excellent weld and impact strength and has an improved anti-flash property.

An another object of the present invention is to provide a PPS composition comprising 100 parts by weight of a polymer which is obtained by treating the linear PPS having not less than 70 mol% of a repeating unit of

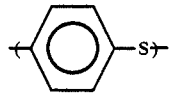

with an aqueous solution of an acid or a salt of a strong acid and a weak base; 0.05 to 5 parts by weight of at least one aminoalkoxysilane compound and, if necessary, 0.01 to 3 parts by weight of a releasing agent.

A further object of the present invention is to provide a PPS composition further blending a fibrous reinforcing material and/or an inorganic non-fibrous filler with the above composition.

A still another object of the present invention is to provide a method of manufacturing the PPS composition.

DETAILED DESCRIPTION OF THE INVENTION

A PPS composition of the present invention is obtained by melt-kneading a mixture containing 100 parts by weight of PPS which is obtained by treating the linear PPS having not less than 70 mol% of a repeating unit of paraphenylene sulfide with an aqueous solution of an acid or a salt of a strong acid and weak base; 0.05 to 5 parts by weight of at least one compound selected from the group consisting of aminoalkoxysilane compounds; and, if necessary, 0.01 to 3 parts by weight of a releasing agent; at a temperature higher than the melting point of the PPS treated with said aqueous solution. This PPS composition has excellent weld and impact strengths as well as improved anti-flash property.

The linear PPS having not less than 70 mol% of a repeating unit of paraphenylene sulfide can be produced by a known method, for example, the method described in U.S. Pat. No. 4,645,826, that is:

(1) reacting a dihaloaromatic compound with sodium sulfide at a temperature of 180° to 235° C. in the presence of 0.5 to 2.4 moles of water per mole of the sodium sulfide in an organic amide solvent to produce a polyphenylene sulfide having melt viscosity of 5 to 300 poise with the conversion ratio of the dihaloaromatic compound being 50 to 98 mol%; and (2) adding water to the reaction system to make the mole ratio of water to sodium sulfide 2.5 to 7.0 and raising the temperature of the system to 245° to 290° C. and continuing the polymerization reaction.

By this method, the linear PPS comprising not less than 70 mol% of paraphenylene sulfide unit, which is a main constituent of PPS, as a repeating unit and of which melt viscosity is in the range of 10 to 30,000 poise is easily manufactured.

The term "melt viscosity of a polymer" used in the present application represents viscosity measured by using a capillary viscometer equipped with a capillary of 10 mm length and 1 mm diameter at 310° C. and a shear rate of 1,200/second, unless otherwise specified.

The term "the linear PPS" used in the present application represents PPS which is obtained when no, or not more than .1 mol% of polyfunctional monomer is used in the polymerization reaction and the obtained polymer is not treated with a known heat curing or, if the curing is performed, the melt viscosity of the polymer after curing is less than 3 times that of before curing.

The linear PPS used in the present invention is a polymer which has not less than 70 mol%, preferably not less than 80 mol%, of paraphenylene sulfide unit as a repeating unit. If the content of the repeating unit is less than 70 mol%, the PPS is prone to have a reduced crystallization degree, which is a characteristic of the crystalline polymer, and a poor strength. The linear PPS of the present invention may also contain less than 30 mol% of other repeating unit. Examples of the other repeating units include the following: a metaphenylene sulfide unit,

a diphenylketone sulfide unit,

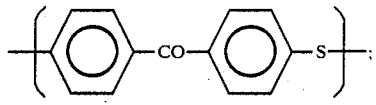

a diphenylsulfone sulfide unit,

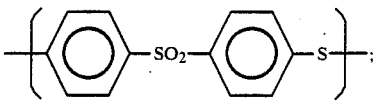

A biphenyl sulfide unit,

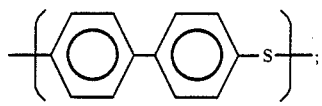

a diphenylether sulfide unit,

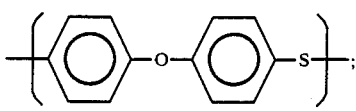

a 2,6-naphthalene sulfide unit,

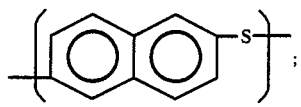

and a trifunctional unit,

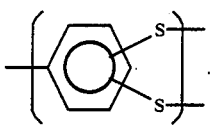

The content of the trifunctional unit among these units is preferably not more than 1 mol% from the viewpoint not to reduce the crystallization degree.

As the linear PPS of the present invention, homopolymers having a repeating unit of paraphenylene sulfide and block copolymers having 70 to 95 mol% of a repeating unit of paraphenylene sulfide and 5 to 30 mol% of a repeating unit of metaphenylene sulfide are particularly preferable. Examples of dihaloaromatic compounds which can be used to produce the linear PPS of the present invention are, for example, p-dichlorobenzene, m-dichlorobenzene, p-dibromobenzene, 2,6-dichloronaphthalene, 2,6-dibromonaphthalene, 4,4'-dichlorobiphenyl, 4,4'-dibromobiphenyl, 4,4'-dichlorodiphenyl ether, 4,4'-dichlorodiphenylsulfone, 4,4'-dichlorodiphenylketone.

Examples of organic amide solvents which can be used in the polymerization reaction to obtain the linear PPS of the present invention are, for example, N-methylpyrrolidone (NMP), N-ethylpyrrolidone, N,N'-dimethylformamide, N,N'-dimethylacetoamide, N-methylcaprolactam, tetramethylurea, hexamethylphosphoric triamide and mixtures thereof.

The PPS block copolymer to be preferably used in the present invention can be manufactured by the method described in E.P. 166,451 A. For example, the block copolymers can be manufactured by a method comprising a first step in which an organic amide solvent containing paradihalobenzene and sodium sulfide is heated at 160° to 300° C. to produce a reaction liquid containing a paraphenylene sulfide having an average polymerization degree of 20 to 5,000, and having a repeating unit of (A),

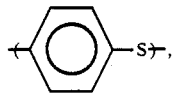

a second step in which the dihaloaromatic compound, which essentially consist of metadihalobenene, is added to the reaction liquid of the first step, the mixture is heated at 160° to 300° C. in the presence of sodium sulfide and an organic amide solvent and obtained a block copolymer comprising a blocks of an above-mentioned repeating unit of (A) and a repeating unit of (B),

in the recipe to make mol% of the repeating unit of (A) 70 to 95 mol%.

The linear PPS to be used in the present invention may be manufactured by an another method than described in U.S. Pat. No. 4,645,826 or EP 166,451A, namely, any method, which can manufacture a substantially linear PPS using polycondensation reaction of an dihaloaromatic compound and an alkaline metal sulfide and is not limited to PPS manufactured by the above methods described particularly in detail.

The linear PPS to be used in the present invention, is treated with an aqueous solution of an acid or a salt of a strong acid and a weak base after completion of the polymerization reaction. This treatment with an aqueous solution can be economically performed by being incorporated into a sequence of steps of the polymerization equipments as an post-treatment of the polymer after polymerization.

As a method to perform the treatment, the method described in EP 216,116A can be applied. Namely, a treatment with an aqueous solution of hydrochloric acid or sulfuric acid of which pH value is less than 2 or with an aqueous solution containing 0.1 to 30% by weight of a salt of a strong acid and a weak base (for example, ammonium chloride or ammonium sulfate may be exemplified as the salt). Suitable aqueous solutions include solutions obtained by using water or mixed solvents containing water, as a main component, and an alcohol, a ketone or an ether.

The linear PPS of the present invention which is treated with an aqueous solution of an acid or a salt of a strong acid and a weak base has a melt viscosity slightly lower than that of the polymer without the treatment, and the melt viscosity in the range of 10 to 20,000 poise is preferable and is more preferable in the range of 30 to 10,000 poise.

One of the objects of the present invention is to obtain a composition which has an improved anti-flash property during molding without spoiling an excellent toughness and weld strength of the linear PPS. To make the composition sufficiently applicable in a practical use, it is necessary to contain an inorganic filler or a reinforcing fibers. And, when it comes to an injection molding, if the melt viscosity of a composition is over 20,000 poise, the injection pressure can not avoid to be high, and a large molding machine with high mold clamping pressure is therefore required. Accordingly, such high melt viscosity is not preferable.

A composition which can not exhibit its characteristic properties in practical use unless relatively large amount of filler is blended (for example, a plastic magnet, etc.), it is a common sense in the field to use a polymer having low melt viscosity. However, in the present invention, the polymer having a melt viscosity of not more than 10 poise can not satisfy a necessary tensile strength or an impact strength in many cases of practical use. Accordingly, such polymer is not preferable.

The objects of the present invention cannot be achieved unless an aminoalkoxysilane compound is added to the linear PPS which has been treated with an aqueous solution of an acid or a salt of a strong acid and a weak base, and, if necessary, a releasing agent is added to the PPS and the mixture is melt-kneaded at a temperature higher than the melting point of the linear PPS treated with the aqueous solution and is blended in a uniform composition. In other words, the composition obtained by melt-kneading the linear PPS exhibits an increased melt viscosity and increased dependency of the melt viscosity on its shear rate, as compared with a raw material, the linear PPS, and the composition is good to obtain a molded product having an improved anti-flash property as well as excellent impact and weld strength.

Flash generated on the molded products during injection-molding, is formed when a molten polymer composition flows into fine gaps designed as parts of the mold, on the internal wall of a cavity, during the molten composition is filled in the cavity and solidified.

Although the flash generation depends upon many factors such as a melt viscosity, an injection pressure, a holding pressure, a mold temperature and a mold clamping pressure, as well as a balance between a cavity and a gate, the position of a venting hole and these factors are all relating together, in view of the flow properties of a molten polymer, the flash generation is suppressed by lowering its melt viscosity at such a place as the gate at which the molten polymer receives high shear stress and flows at a high speed and by increasing the melt viscosity in such a place as inside of the cavity in which the molten polymer receives relatively low shear stress and flows at the slightly low speed, namely, by increasing the dependency of the melt viscosity on the shear rate.

The most direct and simple means for increasing the dependency of the melt viscosity on the shear rate is to increase the melt viscosity of the polymer. However, when a melt viscosity is increased by adding an inorganic filler, the effect of suppressing the flash generation can hardly be expected unless the melt viscosity of matrix polymer itself is increased.

As an aminoalkoxysilane compound to be added to the linear PPS treated with an aqueous solution of an acid or a salt of a strong acid and a weak base, amino, ($C_1$ to $C_4$)-alkyl, ($C_1$ to $C_4$)-alkoxysilanes are preferably used, and γ-aminopropyl, tri-($C_1$ to $C_4$)-alkoxysilane, which is excellent in its effect and is easily available, are more preferably used.

Examples of aminoalkoxysilane compounds include γ-aminopropyltrimethoxysilane, γ-aminopropyltriethoxysilane, γ-aminopropylmethyldiethoxysilane, N-(β-aminoethyl)-γ-aminopropyltrimethoxysilane, N-phenyl-γ-aminopropyltrimethoxysilane and γ-ureidopropyltriethoxysilane.

The amount of the aminoalkoxysilane compound added is 0.05 to 5 parts by weight, preferably 0.1 to 3 parts by weight, based on 100 parts by weight of the linear PPS treated with the aqueous solution.

The addition of less than 0.05 parts by weight of the compound in some cases does not sufficiently produce the effect intended by the present invention, and the addition of over 5 parts by weight of the compound is prone to generate gases easily during the molding process and to increase a production rate of products containing voids. Accordingly, the addition of such amounts of the compound is not preferable.

An Example of the releasing agent which is used according to necessity in the present invention is fatty acid esters of polyhydric alcohols, metal salts of stearic acid or polyethylene wax or fatty acid bisamide compounds. The fatty acid esters of polyhydric alcohols which effectively improve releasing properties even with small amounts and produce small amounts of gases during the molding process are particularly preferable.

The amount of the releasing agent to be added according to necessity in the present invention is 0.01 to 3 parts by weight, preferably 0.05 to 1.5 parts by weight, more preferably 0.1 to 1.0 parts by weight, based on 100 parts by weight of the linear PPS polymer treated with the aqueous solution.

The addition of over 3 parts by weight of the releasing agent is undesirable because it reduces the effect of increasing viscosity of the composition by the addition of an aminoalkoxysilane compound and moreover, it increases the generation of gases during the molding process. The addition of less than 0.01 parts by weight of the releasing agent is meaningless because no effect can be expected.

The resin composition of the present invention containing the linear PPS treated with the aqueous solution of an acid or a salt of a strong acid and a weak base and an aminoalkoxysilane compound or the resin composition containing the above components and the releasing agent to be added according to the necessity is produced by melt-kneading the mixture for a sufficient time to uniformly mix the whole components under a condition of the PPS being melted. The condition which the PPS is melted means a state at a temperature which is 5° to 100° C. higher than the melting point of the PPS. In the present invention, the temperature 10° to 70° C. higher than the melting point of the PPS is preferable.

The aminoalkoxysilane compound is preferably reacted with the PPS for at least 30 seconds, more preferably 30 seconds to 15 minutes, much more preferably 1 to 10 minutes, under kneading in a molten state.

An apparatus used for heating and kneading the composition is not particularly limited provided that the apparatus has a heating and kneading unit which can generally be used for treating polymers, and a single or twin screw extruder having a vent part is preferably used.

The composition of the present invention essentially contains the linear PPS treated with the aqueous solution of an acid or a salt of a strong acid and a weak base and the aminoalkoxysilane compound and beside of these, may contain other substances such as a releasing agent, a filler, a reinforcing material, a stabilizer, a pigment etc., according to necessity.

The filler is selectively used particularly for the purpose of improving the dimensional stability, heat conductivity or electrical characteristics of the composition. Examples of fillers that can be used include granular and powdered mica, silica, talc, alumina, kaoline, titanium oxide, calcium sulfate, calcium carbonate, carbon black, graphite and ferrite and other magnetic powders. The reinforcing material is used particularly for the purpose of improving the mechanical strength in addition to the same purpose as the filler. Examples of reinforcing materials that can be used include glass fibers, carbon fibers, calcium silicate fibers, potassium titanate fibers, alumina fibers, aromatic polyamide fibers and the like.

The amount of the reinforcing material and/or the filler to be added to the composition can be selected with a range which is effective to improve a thermal properties and friction properties, for example, within the range of 0.1 to 400 parts by weight, preferably 1 to 200 parts by weight, based on 100 parts by weight of the PPS.

The composition of the present invention can contain a small amount of another thermoplastic polymer, according to necessity. Examples of thermoplastic polymers that can be blended with the composition include polyether ether ketone, polyether ketone, polyacrylate, polycarbonate, polyether sulfone, modified polyphenylene oxide, polysulfone, polyamide, polyethylene terephthalate, polybutylene terephthalate, polytetrafluoroethylene and other polyarylene sulfides such as polymers having the following repeating unit:

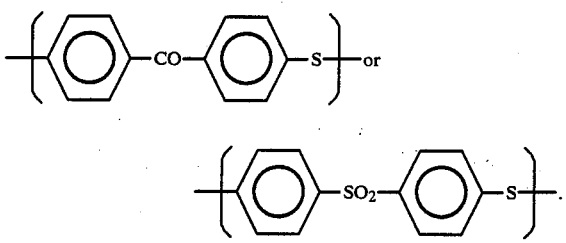

The composition of the present invention can be used in the fields of injection molding, extrusion molding and others, as the PPS composition having excellent mechanical and processing characteristics.

The PPS composition of the present invention maintains the excellent toughness represented by the excellent impact resistance which is a characteristic of the linear PPS or further improves the toughness and remarkably improves melt properties such as increasing the melt viscosity and its dependency on the shear rate, as well as providing injection molded products of which the generation of flash is reduced and the weld strength is improved.

The PPS composition of the present invention also exhibits excellent releasing property and is suitable to obtain precision molded products in a high yield, particularly thin molded products and injection molded products which are designed to have metal parts forced into them and which have complicated shapes.

The present invention is described in detail below with reference to the examples, but the invention is not limited only to the scope described in the examples.

SYNTHETIC EXPERIMENTAL EXAMPLE 1
(Synthesis of Polyparaphenylene Sulfide)

920 kg of N-methylpyrrolidone (hereinafter referred to as NMP) and 424 kg of $Na_2S \cdot 5H_2O$ (containing 46.07% by weight of $Na_2S$) were charged in an autoclave and 168 kg of water was then distilled out by gradually raising the temperature of the mixture to 203° C.

5 kg of water and 50 kg of NMP were added to the residue, and 362 kg of paradichlorobenzene was then charged in the autoclave and the polymerization reaction was performed at 220° C. for 5 hours. 69 kg of water was then added to the reaction liquid and further subjected to polymerization reaction at 255° C. for 5 hours. After cooling the reaction mixture, a granular polymer was separated with a screen having 0.1 mm openings. The granular polymer was then washed with acetone and water to obtain a wet granular polymer. About ⅓ of the wet polymer was dried as it was to obtain a polymer (1-A). The melting point of the polymer (1-A) was 280° C. and the melt viscosity was 1,140 poise. On the other hand, half the remaining polymer was immersed in an aqueous solution of 2% by weight $NH_4Cl$ to be treated at 40° C. for 30 minutes under agitation. The treated polymer was washed with water and dried to obtain a polymer (1-B). Further, half of the remaining wet polymer was immersed in an aqueous solution of hydrochloric acid, of which pH value is 1, and treated at 40° C. for 30 minutes. The treated polymer was neutralized with ammonia water, washed with water and dried to obtain a polymer (1-C).

SYNTHETIC EXPERIMENTAL EXAMPLE 2
(Synthesis of PPS)

930 kg of NMP and 423 kg of $Na_2S \cdot 5H_2O$ (containing 46.07% by weight of $Na_2S$) were charged in an autoclave and 170 kg of water was then distilled out by gradually raising the temperature of the mixture to 203° C. 4 kg of water and 43 kg of NMP were added to the mixture, and 365 kg of paradichlorobenzene was charged in the autoclave and the polymerization reaction was performed at 220° C. for 5 hours. 135 kg of water was added to the reaction mixture and further polymerized at 255° C. for 4.5 hours.

After cooling the reaction mixture, a granular polymer was separated with a screen having 0.1 mm openings. The granular polymer was then washed with acetone and water to obtain a wet granular polymer. About half of the wet granular polymer was dried as it was to obtain a polymer (2-A). The melting point of polymer (2-A) was 283° C. and its melt viscosity was 600 poise. The remaining granular polymer was treated with an aqueous solution of 2% by weight $NH_4Cl$ in the same way used in Synthetic Experimental Example 1, washed with water and dried to obtain a polymer (2-B).

SYNTHETIC EXPERIMENTAL EXAMPLE 3
(Synthesis of Paraphenylene Sulfide-Metaphenylene Sulfide Block Copolymer)

(a) 80 kg of NMP and 37.0 kg of $Na_2S \cdot 5H_2O$ (containing 45.9% by weight of $Na_2S$) were charged in an autoclave and 14.9 kg of water and 12.8 kg of NMP were distilled out by gradually raising the temperature of the mixture to 200° C. 31.0 kg of metadichlorobenzene, 40 kg of NMP and 1.0 kg of water were then added to the mixture, followed by polymerization at 220° C. for 2 hours and then at 230° C. for 5 hours.

(b) 75 kg of NMP and 30.5 kg of $Na_2S \cdot 5H_2O$ (containing 45.9% by weight of $Na_2S$) were charged in another autoclave, and 12.8 kg of water and 13.7 kg of NMP were distilled out by gradually raising the temperature of the mixture to 200° C. 26.5 kg of paradichlorobenzene, 25 kg of NMP, 1.0 kg of water and 23.5 kg of the polymetaphenylene sulfide slurry obtained in (a) were added to the mixture, followed by polymerization at 220° C. for 10 hours. 13.0 kg of water was added to the reaction liquid and further subjected to polymerization at 260° C. for 5 hours.

After cooling the reaction liquid, a granular polymer was separated with a screen having 0.1 mm openings. The granular polymer was then washed with acetone and water to obtain a wet polymer. About half of the wet polymer was dried as it was to obtain a polymer (3-A) (melting point, 275° C., melt viscosity, 1,300 poise).

Further, the remaining polymer mixture was treated with an aqueous solution of 2% by weight of $NH_4Cl$, washed with water, dried and obtained polymer (3-B) (melting point, 275° C.; melt viscosity, 1,300 poise).

The results of analysis of the block copolymers with infrared absorption spectra indicate that the ratio of paraphenylene sulfide to metaphenylene sulfide of each of the copolymers was 85:15.

SYNTHETIC EXPERIMENTAL EXAMPLE 4

A PPS polymer (4) treated with an aqueous solution of 2% by weight of NH$_4$Cl (melting point, 284° C.; melt viscosity, 370 poise) was obtained by the same method as employed in Synthetic Experimental Example 2 with the exception that 370 kg of paradichlorobenzene was charged in an autoclave.

EXAMPLES 1 to 2 AND COMPARATIVE EXAMPLES 1 to 4

A PPS polymer (4) obtained in Synthetic Experimental Example 4 was preliminarily mixed with γ-aminopropyltriethoxysilane A-1100 (hereinafter referred to as AS-1; manufactured by NIPPON UNIKA Co. Ltd.), glass fibers (diameter; 13 μm; manufactured by NIPPON Electric Glass Co., Ltd.) and neopentylglycol distearate as a releasing agent in the ratios shown in Table 1. Each of the mixtures was kneaded for 3 minutes at a cylinder temperature of 320° C. and then extruded with a co-rotating twin-screw kneading extruder into pellets. The procedure for preliminary mixing was as follows:

The PPS and an aminoalkoxysilane compound were first mixed with a Henschel mixer, a releasing agent was then added to the mixture and again mixed by the Henschel mixer and glass fibers were finally added to the mixture and mixed by a tumbler mixer.

Melt viscosities of these pellets were measured with a Capillograph, having a nozzle of L/D=10 mm/1 mm, (manufactured by TOYO SEIKI Co., Ltd.) at 310° C. The results of the measurements are in Table 1.

To indicate the index for the dependency of melt viscosity on the shear rate, ratio of the melt viscosities at a shear rate of 200/second and at the rate of 1,200/second are calculated and the results are also in Table 1. The higher ratio means the higher dependency of melt viscosity on the shear rate.

The test piece of each pellet to measure physical properties are prepared by injection molding machine (temperature of the mold=145° C.).

The various physical properties of the test pieces (without heat treatment) were measured and the results are in Table 2.

It can be seen from Table 1 that the melt viscosity and its dependency on the shear rate of PPS (4) treated with an aqueous solution of 2% by weight of NH$_4$Cl are significantly increased owing to the reaction of PPS with the aminoalkoxysilane.

It can also be seen from Table 2 that the mechanical strength of the PPS composition reacted with an aminoalkoxysilane is relatively better than that of the unreacted PPS and that the composition containing both an aminoalkoxysilane and a releasing agent is well-balanced with respect to the reduction ratio of flash generation and the releasing property. The degree of flash generation was decided by measuring the length of flash generated on each test piece.

The length of a flash was measured by an enlarged photograph, and its evaluation was decided by the following three criteria:

(X): The length of a flash is not less than B 0.5 mm and there is a problem in practical use.

(Δ): The length of a flash is about 0.3 mm and there is no significant problem in practical use, although a small flash exists.

(O): The length of a flash is not more than 0.2 mm and there is no problem in practical use.

The releasing property was determined by injection molding test pieces, under constant molding conditions, using a box-shaped mold with an inner size of 40 mm×60 mm and a thickness of 4 mm (the temperature of the mold; cavity side, 147° C.; core side, 176° C.) and measuring the time (injection time+cooling time) taken until no mark of the ejector pin used was remained on a molded product at the releasing. The length of the time was used as an index of the releasing property and are in Table 2.

TABLE 1

| | Polymer | | Amount of Silane Compound (*1) | Amount of Releasing Agent(*2) | Amount of Glass Fibers (13 μmφ) | Melt Viscosity at 310° C. (poise) | | Ratio of I/II |
|---|---|---|---|---|---|---|---|---|
| | | | | | | Shear Rate | | |
| | Type | Amount | | | | 200/sec (I) | 1200/sec (II) | |
| Com. Ex 1 | 4 | 100 | — | — | — | 500 | 370 | 1.35 |
| Ex. 1-1 | 4 | 100 | 0.8 | — | — | 950 | 630 | 1.51 |
| Ex. 1-2 | 4 | 100 | 0.8 | 0.3 | — | 1000 | 660 | 1.52 |
| Com. Ex 2 | 4 | 100 | — | 0.3 | — | 450 | 360 | 1.25 |
| Com. Ex 3 | 4 | 100 | — | — | 66.7 | 2000 | 1200 | 1.67 |
| Ex. 2-1 | 4 | 100 | 0.83 | — | 66.7 | 2800 | 1500 | 1.87 |
| Ex. 2-2 | 4 | 100 | 0.83 | 0.33 | 66.7 | 2600 | 1400 | 1.86 |
| Com. Ex 4 | 4 | 100 | — | 0.33 | 66.7 | 2000 | 1200 | 1.67 |

Note:
All amounts are part by weight.
Com. Ex. means Comparative Example and Ex. means Example.
(*1)AS-1;
(*2)Neopentylglycol distearate

TABLE 2

| | Physical Properties of Injection Molded Product(As Molded) | | | | | | |
|---|---|---|---|---|---|---|---|
| | Flexural Strength (kg/mm$^2$)(*1) | Flexural Modulus (kg/mm$^2$)(*2) | Tensile Strength (kg/mm$^2$)(*3) | Elongation (%)(*4) | Impact(*5) Strength (kg-cm/cm) | Degree of Flash(*6) Generation | Releasing Property(*7) |
| Com. Ex. 1 | 11.3 | 430 | 7.2 | 2.0 | 17 | X | Δ |
| Example 1-1 | 12.9 | 423 | 8.6 | 2.6 | 41 | Δ | X |
| Example 1-2 | 12.5 | 426 | 9.4 | 3.5 | 36 | Δ | O |
| Com. Ex. 2 | 12.5 | 432 | 8.0 | 2.2 | 25 | X | O |

TABLE 2-continued

| | Physical Properties of Injection Molded Product(As Molded) | | | | | | |
|---|---|---|---|---|---|---|---|
| | Flexural Strength $(kg/mm^2)(*1)$ | Flexural Modulus $(kg/mm^2)(*2)$ | Tensile Strength $(kg/mm^2)(*3)$ | Elongation $(\%)(*4)$ | Impact$(*5)$ Strength (kg-cm/cm) | Degree of Flash$(*6)$ Generation | Releasing Property$(*7)$ |
| Com. Ex. 3 | 25.6 | 1670 | 17.5 | 1.3 | 33 | Δ | Δ |
| Example 2-1 | 26.8 | 1660 | 17.1 | 1.3 | 41 | O | X |
| Example 2-2 | 26.4 | 1660 | 17.8 | 1.4 | 41 | O | O |
| Com. Ex. 4 | 26.0 | 1670 | 17.1 | 1.3 | 33 | Δ | O |

$(*1)$Measured by ASTM D-790
$(*2)$Measured by ASTM D-638
$(*3)$Measured by ASTM D-638
$(*4)$Measured by ASTM D-638
$(*5)$Measured by ASTM D-256 (without notch)
$(*6)$Refer to pages 18 and 19.
$(*7)$The criteria of the releasing property are as follows:
O: Less than 70 seconds
Δ: Less than 70 to 80 seconds
X: over 80 seconds

EXAMPLES 3 TO 10 AND COMPARATIVE EXAMPLES 5 TO 16

As PPS, each granular PPS obtained in the Synthetic Experimental Examples 1 to 3 or a commercially available PPS, which is thermally cured, is used and as an aminoalkoxysilane, AS-1, N-(β-aminoethyl)-γ-aminopropyltrimethoxysilane (Code no. A-1120; manufactured by NIPPON UNIKA Co., Ltd.) or γ-ureidopropyltriethoxysilane (Code no. A-1160; manufactured by NIPPON UNIKA Co., Ltd.) is preliminarily blended with 100 parts by weight of above PPS, in an amount shown in Table 3, by Henschel mixer at room temperature for 5 minutes. At the same time, 0.2 part by weight of neopentylglycol distealate is also blended with the PPS.

Each blend was extruded with a co-rotating twin-screw kneading extruder (Plastic Engineering Institute BT-30) into pellets at the cylinder temperature of 320° C.

The melt viscosity of each sample was measured according to the method described in page 18 and the results are in Table 3.

The ratio of the melt viscosities at shear rates of 200/second and 1,200/second was used as an index expressing the dependency of the melt viscosity of the shear rate.

As can be seen from Table 3, only the mixture of an aminoalkoxysilane and the PPS treated with hydrochloric acid or NH$_4$Cl can leads to increase viscosity and its dependency on the shear rate.

TABLE 3

| | Type of Polymer | Aminoalkoxysilane Type | Amount | Melt Viscosity at 310° C. (poise) | | Ratio I/II |
|---|---|---|---|---|---|---|
| | | | | Shear rate | | |
| | | | | 200/sec. (I) | 1200/sec. (II) | |
| Com. Ex. 10 | 1-A | γ-aminopropyltriethoxysilane | 0.8 | 1770 | 1250 | 1.42 |
| Com. Ex. 11 | 1-A | — | 0 | 1610 | 1140 | 1.41 |
| Example 8 | 1-B | γ-aminopropyltriethoxysilane | 0.8 | 5400 | 2800 | 1.93 |
| Com. Ex. 6 | 1-B | — | 0 | 1390 | 1000 | 1.39 |
| Example 10 | 1-C | γ-aminopropyltriethoxysilane | 0.8 | 5500 | 2850 | 1.93 |
| Com. Ex. 12 | 1-C | — | 0 | 1350 | 980 | 1.38 |
| Com. Ex. 8 | 2-A | γ-aminopropyltriethoxysilane | 0.8 | 820 | 630 | 1.30 |
| Com. Ex. 9 | 2-A | — | 0 | 780 | 600 | 1.30 |
| Example 3 | 2-B | γ-aminopropyltriethoxysilane | 0.8 | 1100 | 730 | 1.51 |
| Example 4 | 2-B | γ-aminopropyltriethoxysilane | 1.5 | 2200 | 1200 | 1.83 |
| Example 5 | 2-B | γ-aminopropyltriethoxysilane | 2.0 | 2700 | 1400 | 1.93 |
| Com. Ex. 5 | 2-B | — | 0 | 700 | 560 | 1.25 |
| Example 6 | 2-B | N-(β-aminoethyl)-γ-aminopropyltrimethoxysilane | 0.8 | 980 | 750 | 1.31 |
| Example 7 | 2-B | γ-ureidopropyltriethoxysilane | 0.8 | 860 | 660 | 1.30 |
| Com. Ex. 15 | 3-A | γ-aminopropyltriethoxysilane | 0.8 | 2020 | 1420 | 1.42 |
| Com. Ex. 16 | 3-A | — | 0 | 1840 | 1300 | 1.42 |
| Example 9 | 3-B | γ-aminopropyltriethoxysilane | 0.8 | 6300 | 3300 | 1.91 |
| Com. Ex. 7 | 3-B | — | 0 | 1630 | 1190 | 1.37 |
| Com. Ex. 13 | (*1) | γ-aminopropyltriethoxysilane | 0.8 | 2300 | 1100 | 2.09 |
| Com. Ex. 14 | (*1) | — | 0 | 2700 | 1300 | 2.08 |

Amounts is part by weight
$(*1)$Thermally cured PPS.

EXAMPLE 11 and COMPARATIVE EXAMPLE 17

Polymer (1-B) obtained in Synthetic Experimental Example 1 was blended with γ-aminopropyltriethoxysilane as an aminoalkoxysilane, glass fibers having a diameter of 13 μm (produced by NIPPON Electric Glass Co., Ltd.) and pentaerythritol tetrastearate as a releasing agent in the ratios shown in Table 4. Each blend obtained was melt-kneaded and pelletized by melt extrusion in the same manner as in the above Examples.

The procedure for blending was as follows:

The PPS and the aminoalkoxysilane were first blended by a Henschel mixer, then the releasing agent was blended with the obtained blend by the same Henschel mixer, and finally the glass fibers were blended by a tumbler mixer.

The value of melt viscosity of the pellets were measured according to the method described in page 18.

The pellets of each composition were fabricated in test pieces for measuring the physical properties by an injection molding machine (mold temperature, 145° C. and cylinder temperature, 310° C.).

These test pieces (as molded) were used for evaluating the physical properties and the degree of flash generation and measuring the weld strength and releasing property.

The results of tests are in Tables 4 and 5.

As can be seen from these tables, the melt viscosity and the dependency thereof on the shear rate of the composition containing an aminoalkoxysilane compound are higher than those of the composition containing no aminoalkoxysilane compound.

As can also be seen from these tables, the composition containing both the aminoalkoxysilane compound and the releasing agent exhibits increased tensile strength and elongation, a reduced amount of flash and well-balanced relationship between the weld strength and the releasing property, as compared with those of the composition containing none of the aminoalkoxysilane compound and the releasing agent.

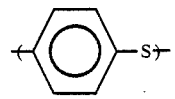

and 5 to 30 mol% of a repeating unit of

4. The melt-kneaded composition of polyphenylene sulfide according to claims 1 or 2, wherein said aminoalkoxysilane compound is an aminoalkylalkoxysilane having an alkyl group of 1 to 4 carbon atoms and an

TABLE 4

| | Polymer | Polymer/Glass Fiber (ratio by weight) | γ-aminopropyltriethoxysilane(*1) | Pentaerythritol tetrastearate(*1) | Melt viscosity at 310° C. (poise) | | |
|---|---|---|---|---|---|---|---|
| | | | | | Shear Rate | | Ratio |
| | | | | | 200/sec. (I) | 1200/sec. (II) | I/II |
| Com. Ex. 17 | 1-B | 60/40 | 0 | 0 | 4500 | 2500 | 1.80 |
| Example 11-1 | 1-B | 60/40 | 0.5 | 0 | 7000 | 3400 | 2.06 |
| Example 11-2 | 1-B | 60/40 | 0.5 | 0.2 | 5800 | 2900 | 2.00 |

(*1)parts by weight based on 100 parts by weight of the polymer

TABLE 5

| | Tensile Strength (kg/mm²) | Elongation (%) | Degree of Flash Generation (*1) | Releasing Property (*2) | Weld strength (kg/mm²) |
|---|---|---|---|---|---|
| Com. Ex. 17 | 17.0 | 1.4 | Δ | Δ | 9.6 |
| Example 11-1 | 18.4 | 1.7 | O | Δ | 10.1 |
| Example 11-2 | 18.4 | 1.7 | O | O | 10.1 |

(*1)Refer to pages 18 and 19.
(*2)Refer to Table 2.

What is claimed is:

1. A melt-kneaded composition of polyphenylene sulfide, having excellent weld and impact strength and an improved anti-flash property when molded, comprising the following ingredients (A) and (B):
   (A) 100 parts by weight of substantially linear polyphenylene sulfide having not less than 70 mol% of a repeating unit of

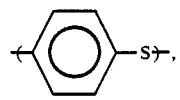

which has been treated with an aqueous solution of an acid or a salt of a strong acid and a weak base; and
   (B) 0.05 to 5 parts by weight of at least one aminoalkoxysilane compound.

2. The melt-kneaded composition of polyphenylene sulfide according to claim 1, further comprising 0.01 to 3 parts by weight of a releasing agent.

3. The melt-kneaded composition of polyphenylene sulfide according to claims 1 or 2, wherein said ingredient (A) is 100 parts by weight of substantially linear polyphenylene sulfide block copolymer comprising 70 to 95 mol% of a releasing unit of alkoxy group of 1 to 4 carbon atoms.

5. The melt-kneaded composition of polyphenylene sulfide according to claim 4, wherein said aminoalkylalkoxysilane is γ-aminopropyltriethoxysilane.

6. The melt-kneaded composition of polyphenylene sulfide according to claims 1 or 2, further comprising a reinforcing material, a filler or a mixture thereof.

7. The melt-kneaded composition of polyphenylene sulfide according to claim 6, wherein said reinforcing material, said filler or said mixture is present in an amount of 0.1 to 400 parts by weight based on 100 parts by weight of said ingredient (A).

8. The melt-kneaded composition of polyphenylene sulfide according to claim 2, wherein said releasing agent is a fatty acid ester of a polyhydric alcohol.

9. The melt-kneaded composition of polyphenylene sulfide according to claims 1 or 2, wherein said polyphenylene sulfide is treated with an aqueous solution of an acid or a salt of a strong acid and a weak base after said polyphenylene sulfide has been polymerized and before said polyphenylene sulfide has been dried.

10. The melt-kneaded composition of polyphenylene sulfide according to claims 1 or 2, wherein said salt of a strong acid and weak base is ammonium chloride or ammonium sulfate.

11. A method of producing a polyphenylene sulfide composition which has excellent weld and impact strength and an improved anti-flash property when molded, comprising the step of kneading with heating a mixture comprising (a) 100 parts by weight of substantially linear polyphenylene sulfide which is obtained by polycondensation of a dihaloaromatic compound and sodium sulfide and is treated with an aqueous solution of an acid or a salt of a strong acid and a weak base thereafter and which has not less than 70 mol% of a repeating unit of

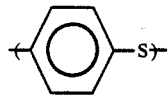

and (b) 0.05 to 5 parts by weight of at least one aminoalkoxysilane compound, wherein said heating is performed at a temperature higher than the melting point of said polyphenylene sulfide.

12. The method of producing a polyphenylene sulfide composition according to claim 11, wherein said mixture further comprises 0.01 to 3 parts by weight of a releasing agent.

13. The method of producing a polyphenylene sulfide composition according to claims 11 or 12, wherein said substantially linear polyphenylene sulfide is a block copolymer comprising 70 to 95 mol% of a repeating unit of

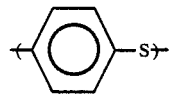

and 5 to 30 mol% of a repeating unit of

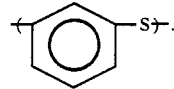

14. The method of producing a polyphenylene sulfide composition according to claims 11 or 12, wherein said aminoalkoxysilane compound is an aminoalkylalkoxysilane having an alkyl group of 1 to 4 carbon atoms and an alkoxy group of 1 to 4 carbon atoms.

15. The method of producing a polyphenylene sulfide composition according to claim 14 wherein said aminoalkylalkoxysilane is γ-aminopropyltriethoxysilane.

16. The method of producing a polyphenylene sulfide composition according to claims 11 or 12, wherein said mixture further comprises a reinforcing material, a filler or a mixture thereof.

17. The method of producing a polyphenylene sulfide composition according to claim 16, wherein said reinforcing material, said filler or said mixture thereof is present in an amount of 0.1 to 400 parts by weight based on 100 parts by weight of said polyphenylene sulfide.

18. The method of producing a polyphenylene sulfide composition according to claim 12 wherein said releasing agent is a fatty acid ester of a polyhydric alcohol.

19. The method of producing a polyphenylene sulfide composition according to claims 11 or 12, wherein said polyphenylene sulfide is treated with said aqueous solution of an acid or a salt of a strong acid and weak base after said polyphenylene sulfide has been polymerized and before said polyphenylene sulfide has been dried.

20. The method of producing a polyphenylene sulfide composition according to claims 11 or 12, wherein said salt of a strong acid and weak base is ammonium chloride or ammonium sulfate.

* * * * *

UNITED STATES PATENT AND TRADEMARK OFFICE
CERTIFICATE OF CORRECTION

PATENT NO. : 4,935,473
DATED : June 19, 1990
INVENTOR(S) : FUKUDA ET AL

Page 1 of 2

It is certified that error appears in the above-identified patent and that said Letters Patent is hereby corrected as shown below:

Column 1, line 51, "draw" should read --draws--.

Column 13, line 56, "distealate" should read --distearate--;

Column 13, line 63, and column 14, line 64; "page 18" should read --column 11, lines 35-37--.

Table 2 Footnotes, line of (*6) and Table 5 Footnotes, line of (*1); "pages 18 and 19" should read --column 11, lines 35-37 and column 12, lines 20-32--.

Col. 15, Claim 3, line 5, "releasing" should read --repeating--.

UNITED STATES PATENT AND TRADEMARK OFFICE
CERTIFICATE OF CORRECTION

PATENT NO. : 4,935,473

DATED : June 19, 1990

INVENTOR(S) : FUKUDA ET AL

Page 2 of 2

It is certified that error appears in the above-identified patent and that said Letters Patent is hereby corrected as shown below:

Col. 15-18, Claims 3, 4, 6, 9, 10, 13, 14, 16, 19, and 20, line 2 of each, "claims" should read --claim--.

Signed and Sealed this

Fifteenth Day of December, 1992

Attest:

DOUGLAS B. COMER

*Attesting Officer*  *Acting Commissioner of Patents and Trademarks*